Figure 1:
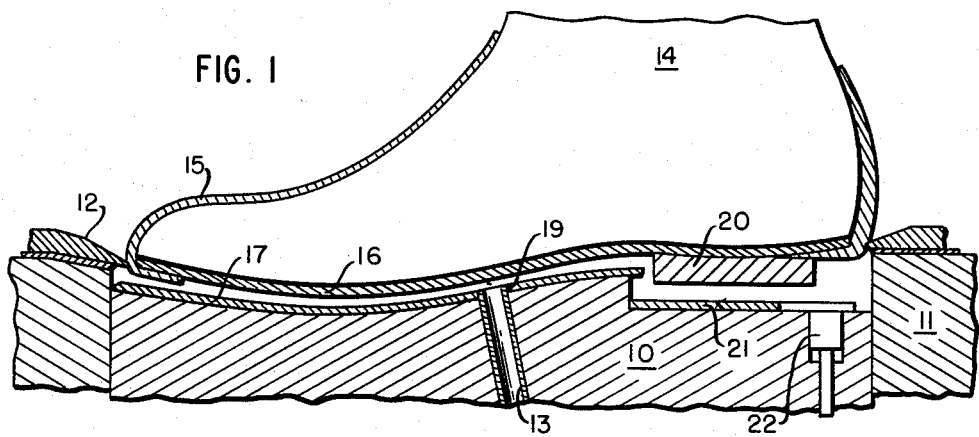

INVENTOR.
Joseph J. Ferreira
BY
Henway, Janney & Hildreth
Attys.

3,178,496
INJECTION PROCESS
Joseph J. Ferreira, Raynham, Mass., assignor to Joseph F. Corcoran Shoe Co. Inc., Stoughton, Mass., a corporation of Massachusetts
Filed July 11, 1962, Ser. No. 209,090
7 Claims. (Cl. 264—244)

This invention finds its place in the new field of producing leather-faced soles or shoe bottoms by the process of injection molding. It comprises a new and improved process of producing such articles as well as the resulting shoe bottoms and shoe bottom units.

Shoe bottoms and soles have been produced heretofore by injecting polyvinylchloride or other synthetic resinous compound into a mold cavity formed in part by the bottom of a lasted shoe. I have discovered however that this process may be utilized in the production of soles having a full leather tread face that resembles in many features the soles found today in the finest type of Goodyear welt shoes.

In addition to its pleasing appearance a sole bottom constructed in accordance with my invention has many outstanding advantages. It is capable of production at much lower cost than a comparable welt shoe. It includes a built-in cushion beneath the foot of the wearer. It obviates the use of filler in the shoe and the step of bottom filling in its manufacturing process. It also eliminates the usual edge setting and edge finishing operations since the marginal edge of the leather portion of the outsole is covered by resinous compound which takes high finish from the mold. It also eliminates all the welt handling steps that require the most highly skilled and expensive labor in the construction of welt shoes, such as welt-sewing, welt-beating and outsole stitching, as well as the usual rough-rounding, edge trimming and stitch-separating or wheeling operations.

The process of my invention is characterized by the employment of a preformed leather sole piece which is accurately placed in a mold having the contour of the finished sole, the sole piece filling the mold from side to side and extending rearwardly to a point behind the heel breast line. In its preferred form the leather sole piece is outwardly beveled about its marginal edge so that it will make an interlocking bond with the molded marginal wall of the resinous compound and exposes to view only a narrow strip or feather. For example, the marginal edge of the sole piece and the molded wall of the resinous compound may have with each other a meeting angle of approximately 45°.

Preferably and as herein shown the resinous compound is injected into the mold cavity through a hole provided for that purpose in the sole piece. Advantage is taken of this fact to locate the sole piece longitudinally in the mold by inserting a stationary injection nozzle which is a part of the press into the hole of the sole. The injection nozzle thus supplements the side mold members in locating the sole piece so that it is positively held in the mold against shifting in either direction during the injection operation. Since the nozzle extends through the sole piece it positively prevents any of the injected resinous compound from flashing upon the outer surface of the sole piece.

These and other features of the invention will be best understood and appreciated from the following description of one satisfactory procedure for carrying it out, selected for purposes of illustration and shown in the accompanying drawings, in which—

Figure 2:
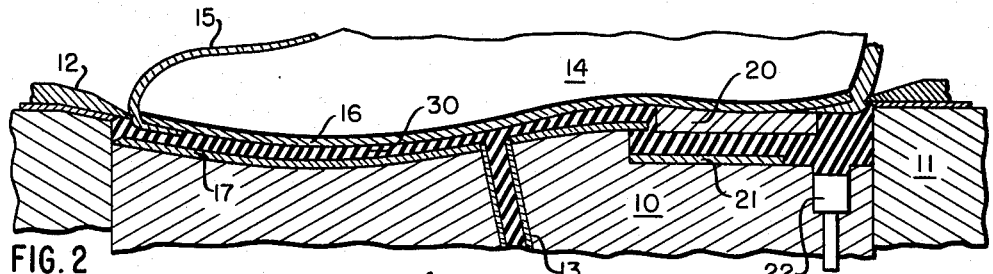
Figure 3:
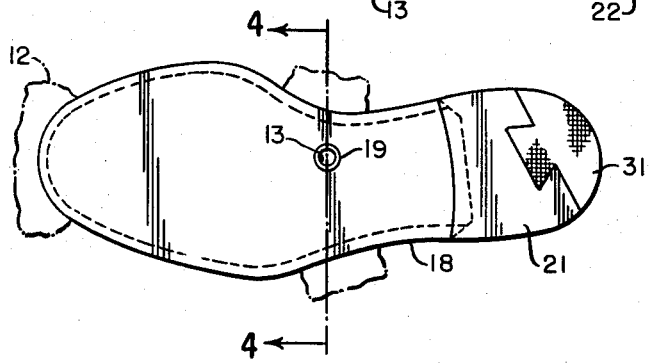
Figure 4:
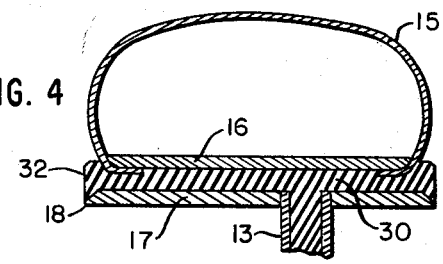
Figure 5:
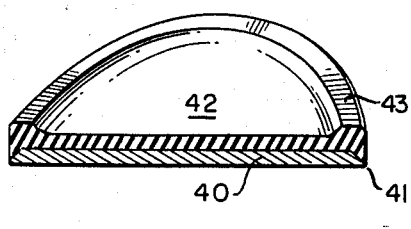

FIG. 1 is a view in longitudinal section of the mold shown as formed in part by a lasted shoe bottom, FIG. 2 is a similar view showing the mold as filled with the injected medium, FIG. 3 is a plan view of the finished shoe bottom on a reduced scale, FIG. 4 is a view in cross section on the line 4—4 of FIG. 3, and FIG. 5 is a view in cross section of a separate outsole unit.

As shown in FIGS. 1 and 2 the mold is represented as lying in horizontal position. It comprises a bottom mold component 10 and cooperating side molds 11 to which are secured inwardly beveled welt plates 12. In the molding operation these welt plates define a surface simulating the surface of a conventional Goodyear welt and for that purpose the lower marginal edge of the welt plates is corrugated or knurled so as to impart to the pseudo welt surface the appearance secured by wheeling or stitch separating leather welting.

The bottom mold component 10 is fixed and has a continuous surface shaped to form the tread face and shank portions of the sole and for that purpose the mold may be embossed, knurled or otherwise fashioned to impart an ornamental texture to the injected plastic compound contacted by it. The rear end of the mold 10 is herein shown as shaped to mold a heel as an integral part of the sole and this may be of any desired height or shape. The bottom mold 10 is drilled and provided with an injection nozzle 13 located about midway between the ends of the lasted shoe, the last 14 being shown with the upper 15 lasted and cemented to the usual insole 16. It is this bottom surface of the lasted shoe, including the insole, which forms the upper or outer side of the mold cavity.

The sole piece 17 herein shown is of the full width of the shoe bottom so that it is engaged by the side molds 11 and welt plates 12 as indicated in FIG. 3 and thus held positively against lateral displacement. The sole piece is of sufficient size to form substantially the whole tread area of the sole and of a length to extend rearwardly behind the heel breast line. The marginal edge of the sole piece is beveled outwardly at an abrupt angle of 45° more or less so that the sole presents a marginal feather 18. The sole piece is also provided with a hole 19 accurately located in its shank portion and of such size as to fit snugly on the inner end of the fixed nozzle 13 which projects inwardly beyond the face of the bottom mold 10 for a short distance into the mold cavity. The nozzle 13 therefore forms the dual function of directing the resinous compound into the mold cavity and of locating the sole piece, thus obviating the necessity of further sole locating means in the mold.

As an optional feature the insole 16 may be provided with a filler 20 which forms a core for the heel and reduces the amount and weight of the resinous compound which would otherwise be concentrated in the heel seat. The bottom mold 10 is shown as recessed to receive a leather top lift 21. If desired this may be provided with a reentrant dovetailed recess in its rear edge. In the molding operation the top lift 21 therefore restricts the area of resinous compound appearing in the tread surface of the heel to a plug 31 which fills the reentrant recess of the top lift and provides a cushion for the wearer.

Having assembled the mold parts and located the sole piece and top lift properly in position polyvinyl chloride or other resinous compound is injected in hot viscous condition through the nozzle 13 into the mold cavity where it spreads out in a layer 30 between the shoe bottom and the sole piece 17 and into the heel seat portion of the mold. Injection continues until the mold cavity is entirely filled and surplus compound begins to show at the telltale passage 22 located at the rear end of the bottom mold 10. When the injected compound has cooled, set and hardened the mold is open and the sole piece 17 withdrawn with the shoe from the fixed nozzle 13. The sprue is then cut off and the hole 19 closed with a plug of sole leather. In the bottom finishing operation this becomes hardly noticeable in the sole. Meanwhile the resinous compound has flowed outwardly forming a marginal wall 32 with a mating angle against the bevel edge of the sole piece 17. Thus the leather edge of the sole piece is sheathed in resinous compound which takes a high mold finish and requires no further treatment in the shoemaking process. The wall 32 also extends upwardly simulating the welt line already explained.

The invention is shown in FIG. 5 as applied to a separate outsole unit, that is to say, one produced separately from the shoe bottom. It comprises the leather sole piece 40 beveled at its edges to present a feather 41 and permanently bonded in face to face contact with a layer of resinous compound 42 having a marginal wall which extends downwardly to sheath the leather sole piece and upwardly to simulate a wheeled welt.

It will be apparent from FIGS. 1 and 2 that the lasted shoe bottom forms the upper component of the mold against which the PVC layer or ply is molded. In forming the separate outsole unit of FIG. 5 a metal mold of the same contour is substituted for the lasted shoe.

The conventional symbol PVC is used herein for polyvinyl chloride as a matter of convenience and for the purpose of including and covering any other synthetic resinous compound having substantially the same characteristics.

Having thus disclosed my invention and described in detail an illustrative procedure for carrying it out, I claim as new and desire to secure by Letters Patent:

1. The process of forming shoe bottoms, characterized by the steps of assembling a mold with a lasted shoe bottom as one side thereof, locating a perforated preformed leather sole in the other side of the mold and in spaced relation from the shoe bottom by means of a fixed nozzle fitting into a perforation of the sole, and injecting polyvinyl chloride through the nozzle to fill the mold cavity between the leather sole piece and the shoe bottom while the sole is held in place by the nozzle.

2. The process of forming shoe bottoms, comprising the steps of assembling a mold with marginal side walls and a lasted shoe bottom as one face thereof, locating a full length leather sole upon the inner opposite face of the mold in spaced relation from the shoe bottom, holding the leather sole against lateral displacement by engagement with the side walls of the mold and against longitudinal displacement by a fixed nozzle projecting beyond the face of the mold and inserted into a perforation of the leather sole, and then injecting a synthetic resinous compound through the nozzle to fill the mold cavity between the leather sole and the shoe bottom and bond the leather sole to the said shoe bottom.

3. The process of forming a shoe bottom, comprising the steps of assembling a mold with a lasted shoe bottom as one face thereof, locating on the other face of the mold a perforated leather sole piece and in the heel seat portion thereof a leather blank having a reentrant dovetail recess in one edge, holding the perforated sole piece in spaced relation from one surface of the mold cavity by inserting a fixed nozzle in its perforation and then injecting a resinous compound into the mold cavity filling said reentrant recess and forming a tread face which is flush with that of the said leather blank.

4. The process of forming a shoe bottom, comprising the steps of assembling a mold with a lasted shoe bottom as one face thereof, locating a preformed sole piece having an outwardly beveled feather edge and a perforation in its shank portion in the other side of the mold, holding the sole piece in spaced relation from one surface of the mold cavity by inserting a fixed nozzle in said perforation, and then injecting a resinous compound through the said perforation and forming thereof an overlying layer and a marginal wall meeting the beveled edge of the sole piece at a common vertex.

5. The process of forming shoe bottoms, characterized by the steps of assembling a mold comprising—
 (1) side mold elements,
 (2) a lasted shoe bottom as an outer mold face, and
 (3) an inner mold face having a fixed nozzle projecting therefrom,
then locating lengthwise in the mold and in spaced relation from the lasted shoe bottom a perforated and otherwise loose sole by inserting the fixed nozzle in the perforation of the sole surrounding the side edges of the sole by the side mold elements, and then injecting a viscous resinous compound by means of the nozzle through the perforation of the sole to fill the mold cavity between the shoe bottom and the sole, thus bonding the sole to the shoe bottom and forming a marginal bond of resinous compound about the edge of the sole.

6. In a process of manufacturing shoes according to claim 5, positioning and retaining the sole within the mold by forming a hole in the sole at a predetermined location and fitting the sole in the mold with the peripheral wall which bounds the said hole fitting snugly around the nozzle through which the fluid plastic material is injected into the mold cavity.

7. The process of forming shoe bottoms according to claim 5 further characterized in that the perforated sole extends rearwardly from the fixed nozzle to a point beyond the heel breast line of the shoe.

References Cited by the Examiner

UNITED STATES PATENTS

| | | | |
|---|---|---|---|
| 2,607,061 | 8/52 | Leahy et al. | 18—59 X |
| 2,794,270 | 6/57 | Dubner. | |
| 2,799,034 | 7/57 | Crowell et al. | 18—59 X |
| 3,026,573 | 3/62 | Ciaio | 18—59 |

FOREIGN PATENTS

| | | |
|---|---|---|
| 678,671 | 1/64 | Canada. |
| 840,839 | 7/60 | Great Britain. |
| 491,208 | 2/54 | Italy. |

ROBERT F. WHITE, *Primary Examiner.*

ALEXANDER H. BRODMERKEL, *Examiner.*